United States Patent [19]

Doi et al.

[11] Patent Number: 4,999,409
[45] Date of Patent: Mar. 12, 1991

[54] DIOLEFIN POLYMER OF COPOLYMER AND A PROCESS FOR THE PRODUCTION OF THE SAME

[75] Inventors: Yoshiharu Doi, Kanagawa; Kazuo Soga, Tokyo; Satoshi Ueki, Saitama, all of Japan

[73] Assignee: Toa Nenryo Kogyo Kabushiki Kaisha, Tokyo, Japan

[21] Appl. No.: 251,091

[22] Filed: Sep. 29, 1988

[30] Foreign Application Priority Data

Sep. 29, 1987 [JP] Japan .................. 62-242804

[51] Int. Cl.$^5$ ................................ C08F 4/68
[52] U.S. Cl. .................. 526/169.2; 526/336; 526/337; 585/10; 585/12; 585/18; 585/507
[58] Field of Search ............. 585/10, 12, 18, 507; 526/336, 337, 169.2

[56] References Cited

U.S. PATENT DOCUMENTS 3,351,621 11/1967 Bacskai ........................ 526/336
3,435,020 3/1969 Olson ........................... 526/336
3,472,830 10/1969 Baxter et al. ................. 526/336
3,795,615 3/1974 Pappas et al. ................ 526/337
3,880,819 4/1975 Natta et al. .................. 526/336

Primary Examiner—Patrick P. Garvin
Assistant Examiner—E. D. Irzinski
Attorney, Agent, or Firm—Wenderoth, Lind & Ponack

[57] ABSTRACT 1,4-Addition polymers or copolymers of diolefins useful as a functional or active polymer is provided which comprises, in combination, the following recurring units (A) and (B):

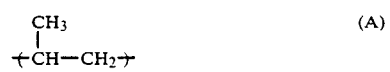

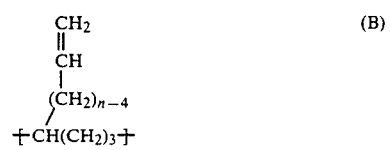

wherein n=4 to 6 and A/B mole ratio=0 to 98/100 to 2.

12 Claims, 3 Drawing Sheets

FIG. I
(1)
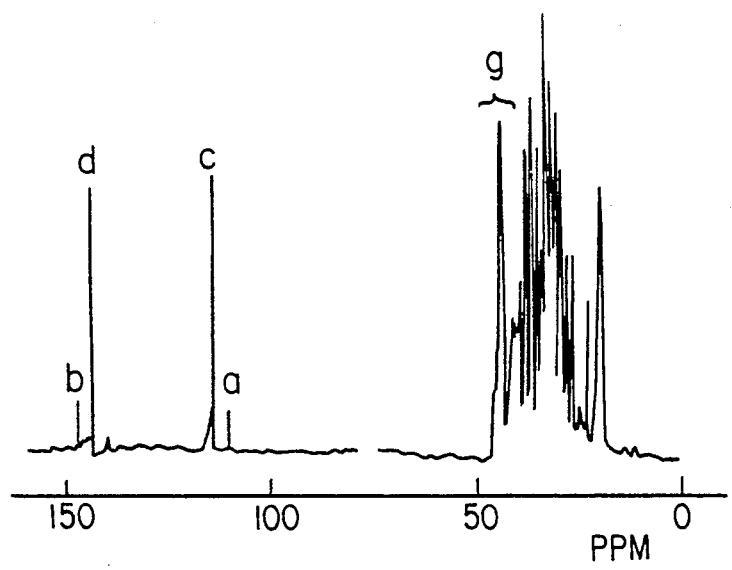
FIG. I
(2)
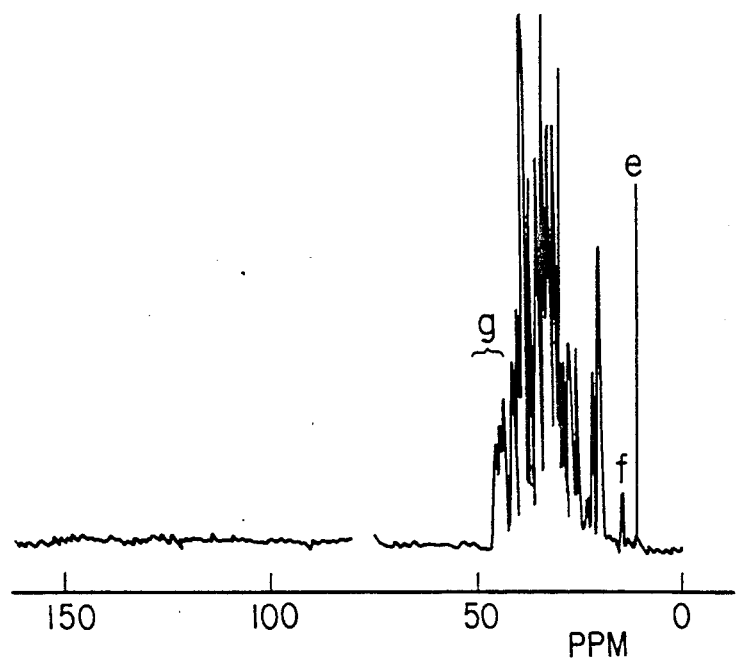

(1)

(2)

DIOLEFIN POLYMER OF COPOLYMER AND A PROCESS FOR THE PRODUCTION OF THE SAME

BACKGROUND OF THE INVENTION

1. Field of the Invention

This invention relates to novel polymers or copolymers of diolefins such as hexadiene and a process for the production of the same.

2. Description of the Prior Art

It is known that homopolymerization of 1,5-hexadiene or copolymerization thereof with α-olefins such as propylene using Ziegler-Natta type catalysts results in 1,2-addition or cyclization of 1,5-hexadiene. "Ziegler-Natta Catalysts and Polymerization" by Academic Press (1979), page 549 describes that when 1,5-hexadiene is polymerized at +25° C. or −20° C. using a catalyst consisting of V(acetylacetonato)$_3$ and AlEt$_2$Cl, a 1,2-addition polymer is obtained.

Up to the present time, however, it has not been reported that 1,5-hexadiene is polymerized through 1,4-addition.

SUMMARY OF THE INVENTION

It is an object of the present invention to provide novel polymers or copolymers of diolefins.

It is another object of the present invention to provide 1,4-addition polymers or copolymers of diolefins having double bonds at both the terminals, such as 1,5-hexadiene, 1,7-octadiene, etc. by homopolymerization or copolymerization with α-olefins such as propylene.

It is further object of the present invention to provide a process for the production of diolefin polymers or copolymers.

These objects can be attained by a diolefin polymer comprising, in combination, the following recurring structural units (A) and (B), $$\begin{array}{c} CH_3 \\ | \\ {+}CH{-}CH_2{+} \end{array} \quad (A)$$

$$\begin{array}{c} CH_2 \\ \| \\ CH \\ | \\ (CH_2)_{n-4} \\ | \\ {+}CH{+}CH_2)_3{+} \end{array} \quad (B)$$

wherein n=4 to 6 and A/B mole ratio=0-98/100-2.

BRIEF DESCRIPTION OF THE DRAWINGS

The accompanying drawings are to illustrate the principle and merits of the present invention in detail.

FIG. 1 (1) and (2) are NMR spectrum charts of a copolymer of the present invention (Example 1).

DETAILED DESCRIPTION OF THE INVENTION

Figure 2:
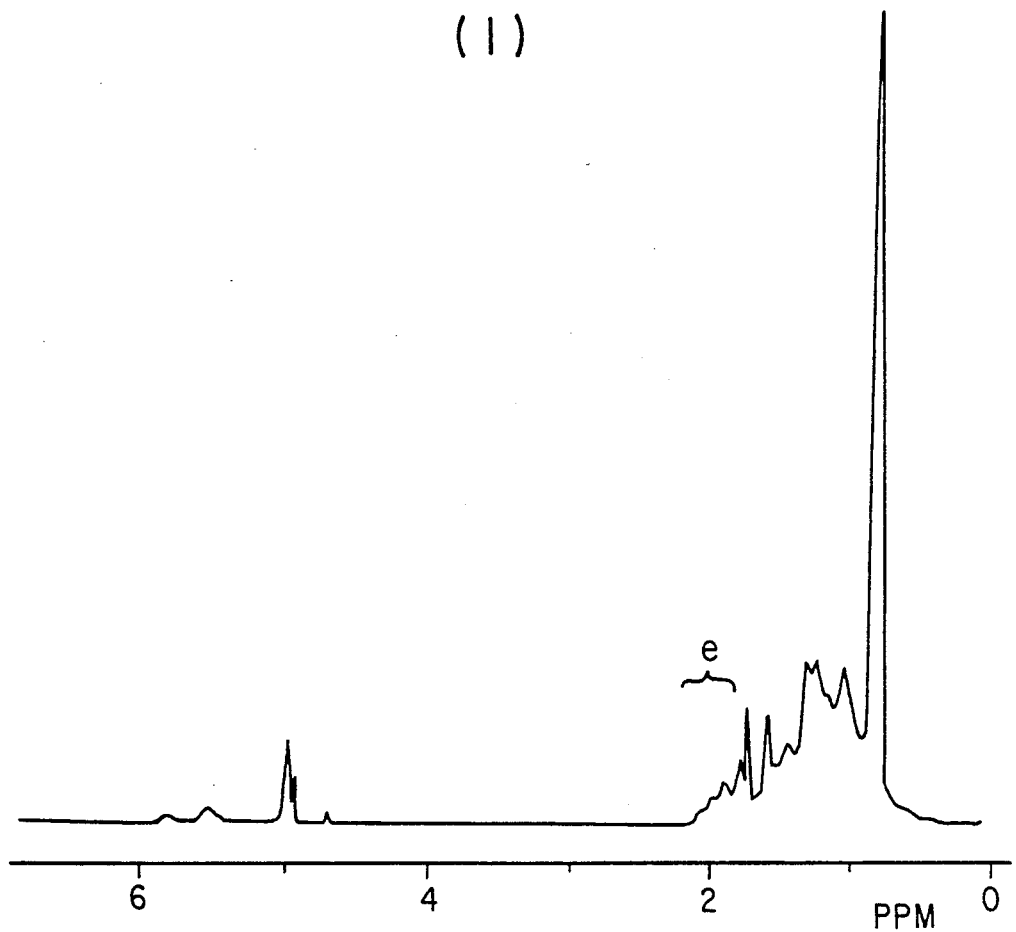
FIG. 2 (1) is an NMR spectrum chart of another polymer of the present invention (Example 2) and FIG. 2 (2) is a partly enlarged view of FIG. 2 (1) in the range of 4.5 to 6 PPM.
Figure 2:
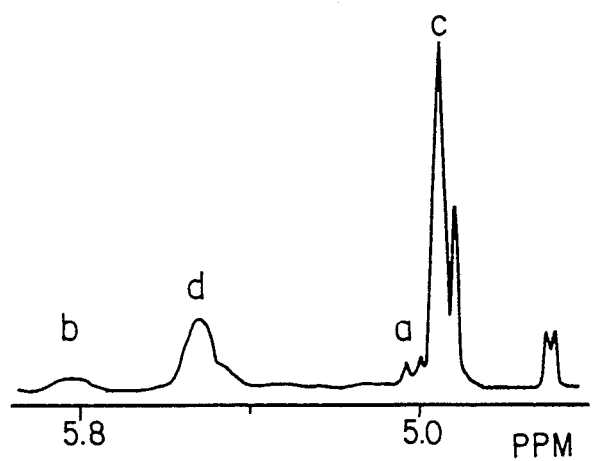

The inventors have made various efforts to develop a diolefin polymer having C-C double bonds in the side chains, useful as a functional polymer, and consequently, have found that a 1,4-added polymer or copolymer can be obtained by homopolymerization of 1,5-hexadiene or 1,7-octadiene or copolymerization thereof with propylene at a low temperature, e.g. −50° C. in the presence of a catalyst consisting of a vanadium chelate compound and organoaluminum compound.

Accordingly, the present invention provides a diolefin polymer comprising, in combination, the following recurring structural units (A) and (B) and generally having $CH_2{=}CH{+}CH_2{+}_n$ at the terminals, $$\begin{array}{c} CH_3 \\ | \\ {+}CH{-}CH_2{+} \end{array} \quad (A)$$

$$\begin{array}{c} CH_2 \\ \| \\ CH \\ | \\ (CH_2)_{n-4} \\ | \\ {+}CH{+}CH_2)_3{+} \end{array} \quad (B)$$

wherein n=4 to 6 and A/B mole ratio=0 to 98/100 to 2, and a process for the production of the diolefin polymer comprising polymerizing a diolefin represented by the general formula $CH_2{=}CH{+}CH_2{+}_{n-2}CH{=}CH_2$ wherein n has the same meaning as above or copolymerizing the diolefin with propylene at a temperature of −50° C. or lower in the presence of a catalyst consisting of a vanadium compound represented by the general formula, $$\left( \begin{array}{c} R^2 \\ | \\ R^1{-}C{\diagup}C{\diagdown}C{-}R^3 \\ \| \quad O \quad \| \\ C \qquad\qquad C \\ O{\diagdown}\;\;V\;\;{\diagup}O \end{array} \right)_3$$

wherein R$^1$ to R$^3$ are hydrocarbon groups having 1 to 8 carbon atoms or hydrogen atoms, at least one of which must be hydrogen atom but all of which must not be hydrogen atoms and an organoaluminum compound.

Catalyst (a) Vanadium Compound

The vanadium compound used as one component of the catalyst in the present invention is represented by the following general formula, $$\left( \begin{array}{c} R^2 \\ | \\ R^1{-}C{\diagup}C{\diagdown}C{-}R^3 \\ \| \quad O \quad \| \\ C \qquad\qquad C \\ O{\diagdown}\;\;V\;\;{\diagup}O \end{array} \right)_3$$

wherein R$^1$ to R$^3$ have the same meaning as described above.

Examples of the vanadium compound included in the above described general formula will be illustrated:

(i) Cases where R$^2$ is hydrogen atom and R$^1$ and R$^3$ are hydrocarbon groups R$^1$/R$^3$: CH$_3$/CH$_3$, CH$_3$/C$_2$H$_5$, C$_2$H$_5$/C$_2$H$_5$, CH$_3$/C$_6$H$_5$, C$_2$H$_5$/C$_6$H$_5$, C$_6$H$_5$/C$_6$H$_5$, CH₃/C₆H₅CH₂, C₆H₅CH₂/C₆H₅CH₂, C₂H₅/C₆H₅CH₂ and C₆H₅/C₆H₅CH₂

(ii) Cases where R² is a hydrocarbon group, one of R¹ and R³ is hydrogen atom and the other is a hydrocarbon group R²/R¹ or R³: CH₃/CH₃, C₂H₅/CH₃, CH₃/C₂H₅, C₂H₅/C₂H₅, C₆H₅/CH₃, CH₃/C₆H₅, C₆H₅/C₂H₅, C₂H₅/C₆H₅, C₆H₅/C₆H₅, C₆H₅CH₂/CH₃, CH₃/C₆H₅CH₂, C₆H₅CH₂/C₆H₅CH₂, C₆H₅CH₂/C₂H₅, C₂H₅/C₆H₅CH₂, C₆H₅CH₂/C₆H₅, C₆H₅/C₆H₅CH₂

(iii) Cases where R² is hydrogen atom, one of R¹ and R³ is hydrogen atom and the other is a hydrocarbon group R¹ or R³: CH₃, C₂H₅, C₆H₅, C₆H₅CH₂

Above all, the following compounds are particularly preferable:

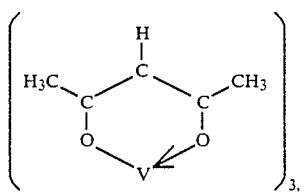

V(acetylacetonato)₃

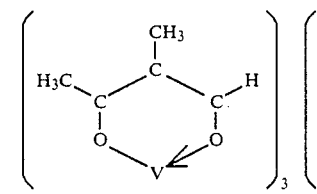 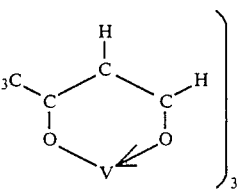

V(2-methyl-1,3-butane-dionato)₃    V(1,3-butanedionato)₃

(b) Organoaluminum Compound

The organoalumiinum compound used as the other component of the catalyst in the present invention is represented by the general formula $R_nAlX_{3-n}$ wherein R is an alkyl group or aryl group, X is a halogen atom or hydrogen atom and n is in the range of $1 \leq n < 3$, illustrative of which are alkylaluminum compounds having 1 to 18 carbon atoms, preferably 2 to 6 carbon atoms, such as dialkylaluminum monohalides, monoalkylaluminum dihalides, alkylaluminum sesquihalides, etc., mixtures thereof or complex compounds thereof. Examples of the organoaluminum compound are dialkylaluminum monohalides such as dimethylaluminum chloride, diethylaluminum chloride, diethylaluminum bromide, diethylaluminum iodide, diisobutylaluminum chloride and the like; monoalkylaluminum dihalides such as methylaluminum dichloride, ethylaluminum dichloride, methylaluminum dibromide, ethylaluminum dibromide, ethylaluminum diiodide, isobutylaluminum dichloride and the like; and alkylaluminum sesquihalides such as ethylaluminum sesquichloride and the like.

The proportion of the vanadium compound and organoaluminum compound used in the present invention is 1 to 1000 mols of the organoaluminum compound per 1 mol of the vanadium compound, and the vanadium compound is used in a proportion of $1 \times 10^{-5}$ to 0.5 mole to 1 mole of the diolefin used. Furthermore, the catalyst of the present invention is generally of a homogeneous system.

Polymerization or Copolymerization of Diolefins

Useful examples of the diolefin used in the present invention are 1,5-hexadiene, 1,6-heptadiene, 1,7-octadiene, etc. Homopolymerization or copolymerization of these diolefins is preferably carried out in a solvent that is inert to the (co)polymerization reaction and liquid during the (co)polymerization. Illustrative of the solvent are hydrocarbons such as propane, butane, pentane, hexane, heptane, toluene and the like. Furthermore, it is possible to effect the copolymerization in propylene monomer.

The (co)polymerization temperature is generally at most $-50°$ C. If it is particularly lower than $-65°$ C., there is obtained a (co)polymer having an Mw (weight-average molecular weight)/Mn (number-average molecular weight) ratio of 1.05 to 1.4, namely that is approximately of a monodisperse system. With the increase of the (co)polymerization time, the yield and molecular weight of the (co)polymer can be increased.

The thus obtained (co)polymer according to the present invention comprises the following structural units, in combination:

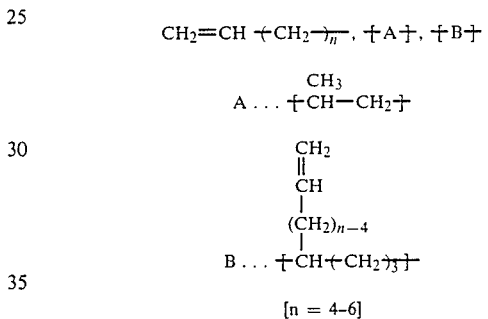

In the above described structure, A/B mole ratio is 0–98/100–2 and Mn is about 2,000 to about 500,000 in terms of propylene, the structural units A and B being in random combination.

According to the present invention, 1,4-added diolefin polymers such as those of 1,5-hexadiene, 1,7-octadiene, etc, can be produced with a selectivity of 100%.

The (co)polymer of the present invention having carbon to carbon double bonds in the side chains can be used for the modification of the properties of other compounds through the addition thereto. Thus, the (co)polymer of the present invention is very useful as raw materials for adhesives, paints, blending solvents for increasing compatibility, surfactants, viscosity index improvers of lubricating oils, etc. utilizing the above described characteristics.

The following examples are given in order to illustrate the present invention without limiting the same.

Example 1

30 ml of toluene was charged in a 300 ml flask adequately purged with nitrogen gas and cooled to $-78°$ C., to which 42 millimoles of propylene and 50 millimoles of 1,5-hexadiene were then added at the same temperature. Thereafter, a solution of 20 millimoles of Al(C₂H₅)₂Cl in toluene and a solution of 1 millimole of V(acetylacetonato)₃ in toluene were added thereto and stirred to initiate the polymerization. After the polymerization was carried out at $-78°$ C. for 4 hours, the polymerization product was contacted with 300 ml of a mixed solution of hydrochloric acid-ethanol and the resulting polymer was washed with 300 ml of ethanol five times, followed by drying at room temperature under reduced pressure.

The molecular weight of the resulting polymer was measured by GPC method, thus obtaining results of Mn=8,300 (in terms of propylene) and Mw/Mn=1.4. The polymer had a $^{13}$C-NMR spectrum as shown in FIG. 1 (1) whose assignments are as follows:

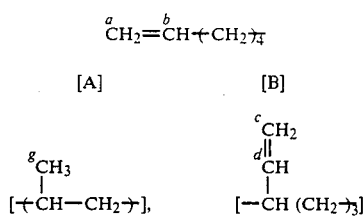

This polymer was hydrogenated in the same manner as described in "Macromolecules" 19 (1986), 2409 and subjected to measurement of its $^{13}$C-NMR spectrum, thus obtaining results as shown in FIG. 1 (2). The assignments are as follows:

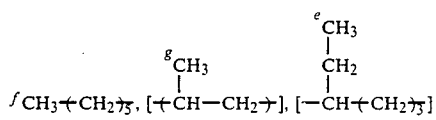

The assignments of FIG. 1 (1) are found correct from the fact that the peaks identified to correspond to the carbon atoms having double bonds in FIG. 1 (1) disappear.

It is found from the foregoing results and intensity ratio of $^{13}$C-NMR spectra that the resultant polymer is a random copolymer comprising 88.0 mole % of the foregoing structural unit A (polypropylene segment) and 12.0 mole % of the structural unit B (1,4-added hexadiene segment) and having CH$_2$=CH—(CH$_2$)$_4$ groups at the terminals.

Examples 2 to 4

Copolymerizations of propylene with 1,5-hexadiene were carried out in an analogous manner to Example 1 except changing the copolymerizing conditions as shown in Table 1. The results are also shown in Table 1.

The H-NMR spectrum of the copolymer obtained in Example 2 is shown in FIG. 2, whose assignments are as follows:

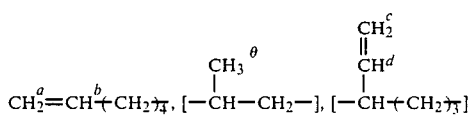

Example 5

Homopolymerization of 1,5-hexadiene was carried out in an analogous manner to Example 1 employing the polymerizing conditions as shown in Table 1 except using no propylene. Measurement of the $^{13}$C-NMR spectrum of the product teaches that this is a hexadiene homopolymer having the following structure which is 1,4-added in a proportion of 100%:

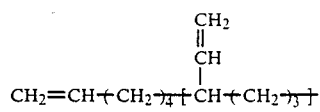

Examples 6 and 7

Copolymerizations of propylene and 1,5-hexadiene were carried out in an analogous manner to Example 1 except using V(2-methyl-1,3-butanedionato)$_3$ instead of the V(acetylacetonato)$_3$ as the vanadium compound and using the copolymerizing conditions as shown in Table 1. The results are also shown in Table 1.

Example 8

Figure 3:
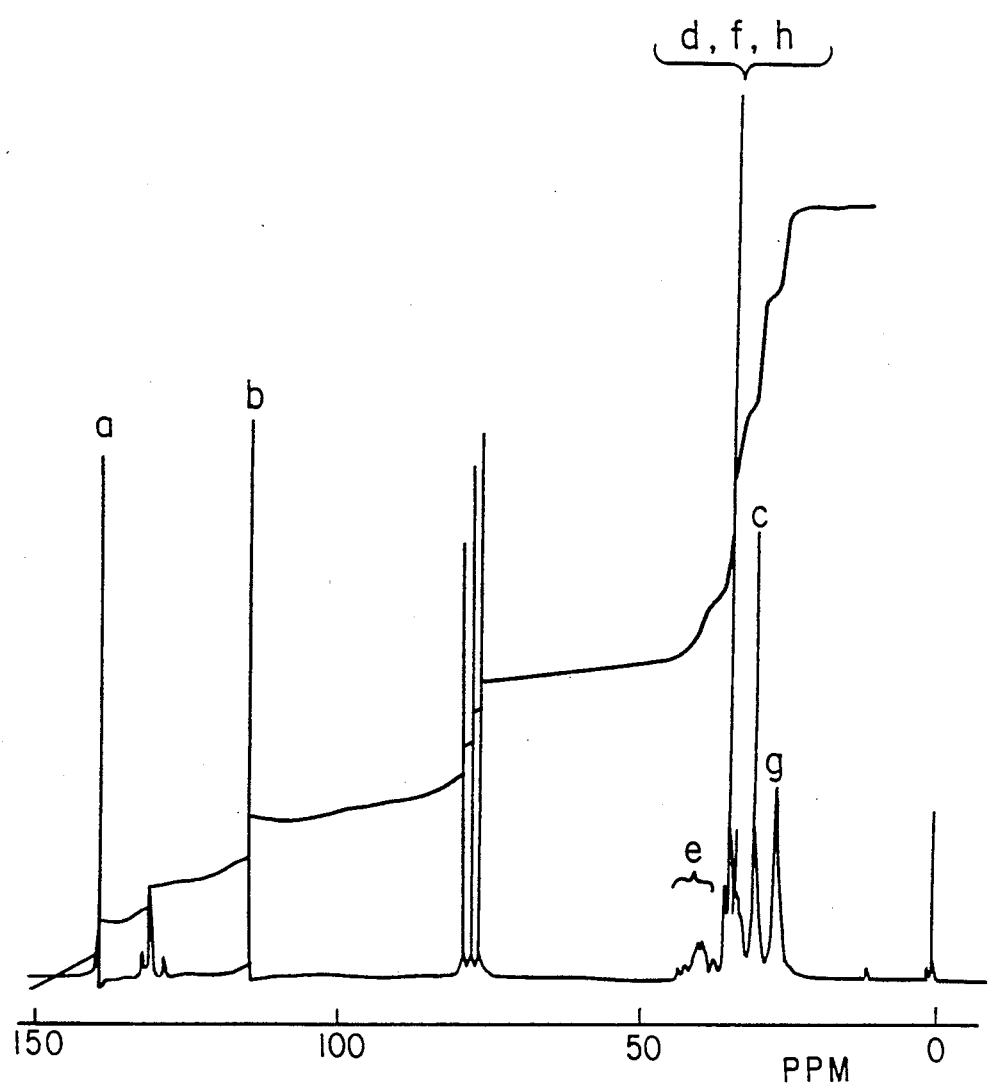
FIG. 3 is an NMR spectrum chart of a further polymer of the present invention (Example 8).

Polymerization of 1,7-octadiene was carried out in an analogous manner to Example 1 except using the polymerizing conditions as shown in Table 1. The results are shown in Table 1. The resulting polymer has a $^{13}$C-NMR spectrum as shown in FIG. 3, whose assignments are as follows:

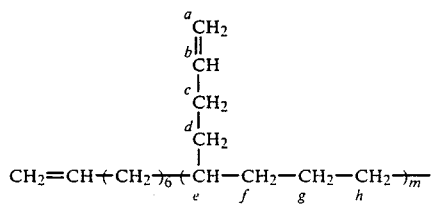

It is found from the above described results that the resulting polymer is a homopolymer of 1,7-octadiene having the above described structure, which is 1,4-bonded.

Example 9

Copolymerization of propylene and 1,7-octadiene was carried out in an analogous manner to Example 1 except employing the copolymering conditions as shown in Table 1. The results are also shown in Table 1.

TABLE 1

| Example | Organo-aluminum Compound/ V compound (mole ratio) | Temperature (°C.) | Time (hr) | Propyrene (millimole) | 1,5-Hexadiene (millimole) | Yield (g/g · V) | $\overline{Mn}$ | $\overline{Mw}/\overline{Mn}$ | Content of Structural Unit B (mole %) |
|---|---|---|---|---|---|---|---|---|---|
| 3 | 10 | −78 | 3 | 830 | 25 | 24 | 6,900 | 1.3 | 3.0 |
| 4 | 10 | −78 | 6 | 830 | 25 | 55 | 15,700 | 1.3 | 4.3 |
| 2 | 20 | −78 | 4 | 83 | 25 | 24 | — | — | 7.4 |

TABLE 1-continued

| Example | Organo-aluminum Compound/ V compound (mole ratio) | Temperature (°C.) | Time (hr) | Propyrene (millimole) | | Yield (g/g · V) | $\overline{Mn}$ | $\overline{Mw}/\overline{Mn}$ | Content of Structural Unit B (mole %) |
|---|---|---|---|---|---|---|---|---|---|
| 1 | 20 | −78 | 4 | 42 | 50 | 43 | 8,300 | 1.4 | 12.0 |
| 5 | 10 | −78 | 6 | 0 | 50 | 29 | 5,000 | — | 100 |
| 6 | 100 | −60 | 3 | 830 | 25 | 235 | 29,700 | 1.5 | 3.4 |
| 7 | 200 | −60 | 4 | 83 | 25 | 627 | 23,100 | 1.8 | 6.5 |
|  |  |  |  |  | 1,7-Octadiene (millimole) |  |  |  |  |
| 8 | 10 | −78 | 8 | 0 | 50 | 10 | 4,100 | 1.4 | 100 |
| 9 | 10 | −78 | 4 | 83 | 25 | 12 | 4,700 | 1.5 | 5.8 |

What is claimed is:

1. A diolefin copolymer consisting essentially of, in combination, the following recurring units (A) and (B):

$$\underset{\text{(A)}}{+\text{CH}-\text{CH}_2+}\quad\underset{|}{\overset{\text{CH}_3}{|}}$$

$$\underset{\text{(B)}}{+\text{CH}+\text{CH}_2\}_3+}\quad\begin{array}{c}\text{CH}_2\\\|\\\text{CH}\\|\\(\text{CH}_2)_{n-4}\\|\end{array}$$

wherein n=4 to 6 and A/B mole ratio=0 to 98/100 to 2.

2. The diolefin copolymer as claimed in claim 1, wherein the recurring units (A) and (B) form a random linkage.

3. The diolefin copolymer as claimed in claim 1, wherein the number-average molecular weight is in the range of about 2,000 to about 500,000 in terms of propylene.

4. The diolefin copolymer as claimed in claim 1, wherein the weight-average molecular weight to number-average molecular weight ratio is in the range of 1.05 to 1.4.

5. A process for the production of a diolefin copolymer as claimed in claim 1, which consists essentially of copolymerizing a diolefin represented by the general formula $CH_2=CH+CH_2+_{n-2}CH=CH_2$ wherein n=4 to 6 with propylene at a temperature of at most −50° C. in the presence of a catalyst consisting of a vanadium compound represented by the general formula,

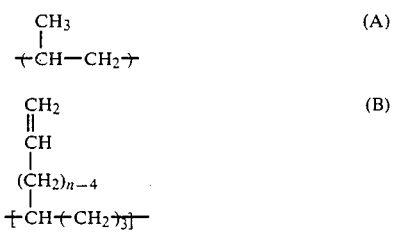

wherein $R^1$ to $R^3$ are hydrogen atoms or hydrocarbon groups having 1 to 8 carbon atoms, at least one of which must be hydrogen atom but all of which must not be hydrogen atoms, and an organoaluminum compound.

6. The process as claimed in claim 5, wherein the vanadium compound is selected from the group consisting of vanadium (acetylacetonato)$_3$, vanadium (2-methyl-1,3-butanedionato)$_3$ and vanadium (1,3-butanedionato)$_3$.

7. The process as claimed in claim 5, wherein the organoaluminum compound is represented by the general formula $R_nAlX_{3-n}$ wherein R is an alkyl group or aryl group, X is a halogen atom or hydrogen atom and n is any numeral in the range of $1 \leq n < 3$.

8. The process as claimed in claim 5, wherein the vanadium compound and organoaluminum compound are used in a proportion of 1 to 1,000 moles of the organoaluminum compound to 1 mole of the vanadium compound.

9. The process as claimed in claim 5, wherein the vanadium compound is used in a proportion of $1 \times 10^{-5}$ to 0.5 mole to 1 mole of the diolefin.

10. The process as claimed in claim 5, wherein the copolymerizing is carried out in the presence of a solvent which is inert to the polymerization or copolymerization and liquid during the polymerization or copolymerization.

11. The process as claimed in claim 10, wherein the solvent is selected from the group consisting of propane, butane, pentane, hexane, heptane and toluene.

12. The process as claimed in claim 10, wherein the solvent is the propylene to be copolymerized.

* * * * *